(12) United States Patent
LaBossiere et al.

(10) Patent No.: US 9,802,360 B2
(45) Date of Patent: Oct. 31, 2017

(54) PLATEN PLANARIZING PROCESS FOR ADDITIVE MANUFACTURING SYSTEM

(71) Applicant: Stratasys, Inc., Eden Prairie, MN (US)

(72) Inventors: Joseph E. LaBossiere, Rogers, MN (US); Michael D. Bosveld, Bloomington, MN (US); Dominic F. Mannella, Minnetonka, MN (US); William J. Swanson, St. Paul, MN (US)

(73) Assignee: Stratsys, Inc., Eden Prairie, MN (US)

( * ) Notice: Subject to any disclaimer, the term of this patent is extended or adjusted under 35 U.S.C. 154(b) by 1011 days.

(21) Appl. No.: 13/909,294

(22) Filed: Jun. 4, 2013

(65) Prior Publication Data
US 2014/0358273 A1    Dec. 4, 2014

(51) Int. Cl.
*G06F 19/00* (2011.01)
*B29C 67/00* (2017.01)
(52) U.S. Cl.
CPC ...... *B29C 67/0051* (2013.01); *B29C 67/0055* (2013.01); *B29C 67/0059* (2013.01); *B29C 67/0088* (2013.01)
(58) Field of Classification Search
None
See application file for complete search history.

(56) References Cited

U.S. PATENT DOCUMENTS

| | | |
|---|---|---|
| 5,121,329 A | 6/1992 | Crump |
| 5,169,081 A | 12/1992 | Goedderz |
| 5,303,141 A | 4/1994 | Batchelder et al. |
| 5,312,224 A | 5/1994 | Batchelder et al. |
| 5,340,433 A | 8/1994 | Crump |
| 5,503,785 A | 4/1996 | Crump et al. |
| 5,738,817 A | 4/1998 | Danforth et al. |
| 5,764,521 A | 6/1998 | Batchelder et al. |
| 5,866,058 A | 2/1999 | Batchelder et al. |
| 5,900,207 A | 5/1999 | Danforth et al. |
| 5,939,008 A | 8/1999 | Comb et al. |
| 5,968,561 A | 10/1999 | Batchelder et al. |
| 6,004,124 A | 12/1999 | Swanson et al. |
| 6,022,207 A | 2/2000 | Dahlin et al. |
| 6,054,077 A | 4/2000 | Comb et al. |
| 6,067,480 A | 5/2000 | Stuffle et al. |

(Continued)

FOREIGN PATENT DOCUMENTS

| | | |
|---|---|---|
| WO | 2004096527 A2 | 11/2004 |
| WO | 2008055533 A1 | 5/2008 |

OTHER PUBLICATIONS

European Search Report and Written Opinion dated Nov. 13, 2014 for corresponding European Patent Application No. 14170045, filed May 27, 2014.

*Primary Examiner* — Robert Fennema
*Assistant Examiner* — Md N Mia
(74) *Attorney, Agent, or Firm* — Peter J. Ims; Westman, Champlin & Koehler, P.A.

(57) ABSTRACT

A method for printing a three-dimensional part with an additive manufacturing system, the method comprising generating and printing a planarizing part having a substantially-planar top surface relative to a build plane, and a bottom surface that substantially mirrors a topography of a platen surface, and printing the three-dimensional part over the substantially-planar top surface of the printed planarizing part.

19 Claims, 7 Drawing Sheets

(56) References Cited

U.S. PATENT DOCUMENTS

| | | |
|---|---|---|
| 6,070,107 A | 5/2000 | Lombardi et al. |
| 6,085,957 A | 7/2000 | Zinniel et al. |
| 6,129,872 A | 10/2000 | Jang |
| 6,228,923 B1 | 5/2001 | Lombardi et al. |
| 6,257,517 B1 | 7/2001 | Babish et al. |
| 6,492,651 B2 | 12/2002 | Kerekes |
| 6,547,995 B1 | 4/2003 | Comb |
| 6,629,011 B1 | 9/2003 | Calderon et al. |
| 6,645,412 B2 | 11/2003 | Priedeman, Jr. |
| 6,685,866 B2 | 2/2004 | Swanson et al. |
| 6,722,872 B1 | 4/2004 | Swanson et al. |
| 6,730,252 B1 | 5/2004 | Teoh et al. |
| 6,749,414 B1 | 6/2004 | Hanson et al. |
| 6,782,303 B1 | 8/2004 | Fong |
| 6,790,403 B1 | 9/2004 | Priedeman, Jr. et al. |
| 6,814,907 B1 | 11/2004 | Comb |
| 6,869,559 B2 | 3/2005 | Hopkins |
| 6,923,634 B2 | 8/2005 | Swanson et al. |
| 6,976,627 B1 | 12/2005 | Culp et al. |
| 6,998,087 B1 | 2/2006 | Hanson et al. |
| 7,122,246 B2 | 10/2006 | Comb et al. |
| 7,127,309 B2 | 10/2006 | Dunn et al. |
| 7,172,715 B2 | 2/2007 | Swanson et al. |
| 7,236,166 B2 | 6/2007 | Zinniel et al. |
| 7,261,533 B2 | 8/2007 | Wrosz et al. |
| 7,306,152 B2 | 12/2007 | Culp et al. |
| 7,384,255 B2 | 6/2008 | LaBossiere et al. |
| 7,481,647 B2 | 1/2009 | Sambu et al. |
| 7,572,121 B2 | 8/2009 | Wrosz et al. |
| 7,604,470 B2 | 10/2009 | LaBossiere et al. |
| 7,625,200 B2 | 12/2009 | Leavitt |
| 7,680,555 B2 | 3/2010 | Dunn et al. |
| 7,744,364 B2 | 6/2010 | Turley et al. |
| 7,896,209 B2 | 3/2011 | Batchelder et al. |
| 7,917,243 B2 | 3/2011 | Kozlak et al. |
| 7,938,351 B2 | 5/2011 | Taatjes et al. |
| 7,938,356 B2 | 5/2011 | Taatjes et al. |
| 8,033,811 B2 | 10/2011 | Swanson et al. |
| 8,070,473 B2 | 12/2011 | Kozlak |
| 8,075,300 B2 | 12/2011 | Zinniel |
| 8,153,182 B2 | 4/2012 | Comb et al. |
| 8,153,183 B2 | 4/2012 | Skubic et al. |
| 8,221,669 B2 | 7/2012 | Batchelder et al. |
| 8,226,395 B2 | 7/2012 | Pax et al. |
| 8,282,380 B2 | 10/2012 | Pax et al. |
| 8,287,794 B2 | 10/2012 | Pax et al. |
| 8,323,017 B2 | 12/2012 | Kritchman et al. |
| 8,419,996 B2 | 4/2013 | Swanson et al. |
| 2004/0173946 A1 | 9/2004 | Pfeifer et al. |
| 2005/0129941 A1 | 6/2005 | Comb et al. |
| 2006/0158456 A1* | 7/2006 | Zinniel ............... B29C 67/0059 345/589 |
| 2007/0003656 A1 | 1/2007 | LaBossiere et al. |
| 2007/0228590 A1 | 10/2007 | LaBossiere et al. |
| 2007/0228592 A1 | 10/2007 | Dunn et al. |
| 2009/0035405 A1 | 2/2009 | Leavitt |
| 2009/0173443 A1 | 7/2009 | Kozlak et al. |
| 2009/0174709 A1* | 7/2009 | Kozlak ............... B29C 67/0055 345/420 |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0080914 A1* | 4/2010 | Forrest ................. H01L 51/0021 427/259 |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0100224 A1 | 4/2010 | Comb et al. |
| 2010/0283172 A1 | 11/2010 | Swanson |
| 2010/0327479 A1 | 12/2010 | Zinniel et al. |
| 2011/0074065 A1 | 3/2011 | Batchelder et al. |
| 2011/0076495 A1 | 3/2011 | Batchelder et al. |
| 2011/0076496 A1 | 3/2011 | Batchelder et al. |
| 2011/0117268 A1 | 5/2011 | Batchelder et al. |
| 2011/0121476 A1 | 5/2011 | Batchelder et al. |
| 2011/0186081 A1 | 8/2011 | Dunn et al. |
| 2011/0190446 A1 | 8/2011 | Matsui et al. |
| 2011/0233792 A1* | 9/2011 | Zhang .................... H01L 24/10 257/778 |
| 2011/0233804 A1 | 9/2011 | Batchelder et al. |
| 2011/0241947 A1 | 10/2011 | Scott et al. |
| 2012/0067501 A1 | 3/2012 | Lyons |
| 2012/0068378 A1 | 3/2012 | Swanson et al. |
| 2012/0070523 A1 | 3/2012 | Swanson et al. |
| 2012/0162314 A1 | 6/2012 | Swanson et al. |
| 2012/0164256 A1 | 6/2012 | Swanson et al. |
| 2013/0054193 A1* | 2/2013 | Schajer .................. G01B 21/20 702/167 |
| 2013/0075957 A1 | 3/2013 | Swanson et al. |
| 2013/0078073 A1 | 3/2013 | Comb et al. |
| 2013/0242317 A1 | 9/2013 | Leavitt et al. |
| 2014/0117575 A1 | 5/2014 | Kemperle et al. |

* cited by examiner

PLATEN PLANARIZING PROCESS FOR ADDITIVE MANUFACTURING SYSTEM

BACKGROUND

The present disclosure relates to additive manufacturing systems for printing three-dimensional (3D) parts and support structures. In particular, the present disclosure relates to processes for planarizing platens used in additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a method for printing a 3D part with an additive manufacturing system having a platen with a platen surface. The method includes measuring heights of multiple points of the platen surface, which provide a mapped topography of the platen surface, calculating a height of a planarizing part as a function of the measured heights, and generating a digital model of the planarizing part based on the calculated height and the mapped topography of the platen surface. The method also includes printing the planarizing part with the additive manufacturing system based on the generated digital model of the planarizing part, where the printed planarizing part has a substantially-planar top surface in a build plane, and a bottom surface that substantially mirrors the mapped topography of the platen surface. The method further includes printing the 3D part over the substantially-planar top surface of the printed planarizing part.

Another aspect of the present disclosure is directed to a method for printing a 3D part, which includes measuring heights of multiple points of a platen surface of a platen retained by an additive manufacturing system, which provide a mapped topography of the platen surface. The method also includes determining a peak height based on the measured heights, and calculating a height of a planarizing part as a function of the determined peak height and a slice thickness for the planarizing part. The method further includes generating a digital model of the planarizing part having a substantially-planar top surface at the calculated height, and a bottom surface that mirrors the mapped topography of the platen surface. The method further includes printing the planarizing part with the additive manufacturing system based on the generated digital model of the planarizing part. In some embodiments, the method further includes printing at least one of the 3D part and a support structure for the 3D part onto the printed planarizing part.

Another aspect of the present disclosure is directed to an object printed with an additive manufacturing system having a platen with a platen surface. The object includes a 3D part, optionally, a support structure for the three-dimensional part, wherein the 3D part and the optional support structure have a bounding box in a build plane, and a planarizing part. The planarizing part includes a top surface on which one or both of the 3D part and the optional support structure are printed, where the top surface is substantially planar in the build plane. The planarizing part also includes a bottom surface that substantially mirrors a topography of the platen surface on which the planarizing part is printed, and a cross-section in the build plane defined at least in part by the bounding box.

Definitions

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "build plane" refers to a plane in which the layers of a 3D part are oriented, and is perpendicular to the layer-printing direction of the 3D part.

The term "height", such as with reference to a height of a platen surface, is taken along the layer-printing direction of the 3D part, and is perpendicular to the build plane.

The term "bounding box" refers to a cross-sectional area footprint in the build plane in which the 3D part(s) and any optional support structure(s) are to be printed.

Unless otherwise specified, temperatures referred to herein are based on atmospheric pressure (i.e. one atmosphere).

The term "providing", such as for "providing a consumable material", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

The term "substantially planar in a build plane", with reference to a top surface of a planarizing part (or digital model thereof), includes deviations from exact flatness due to variations in the movement trajectories of a print head, a calibration device, or the like. This is explained further below with reference to head gantry bowing.

DETAILED DESCRIPTION

Figure 1:
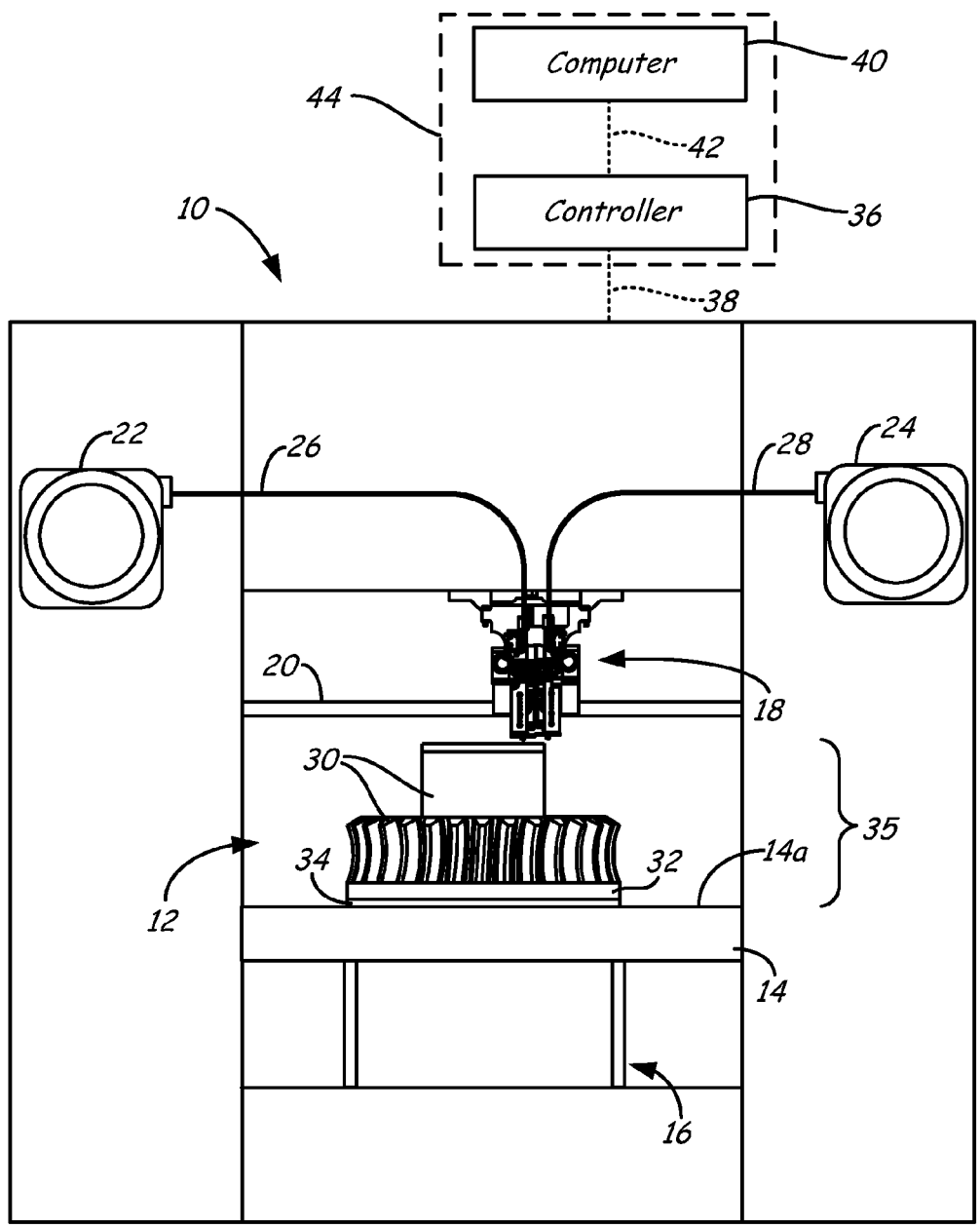
FIG. 1 is a front view of an additive manufacturing system configured to print 3D parts with a planarizing part of the present disclosure.

The present disclosure is directed to a process for planarizing a platen used in an additive manufacturing system. Additive manufacturing systems are preferably capable of printing 3D parts with high resolutions, such as with good part details, thin layers, and the like. To produce the high resolutions, the printed layers are preferably deposited onto planar surfaces to reduce layer-height variations, and to ensure good adhesive bonds to the underlying platen surfaces. As such, the underlying platens that receive the printed layers of the 3D parts are preferably planar in the build plane (i.e., flat and level relative to the print head movement trajectory), where deviations from this planarity can potentially reduce layer accuracies, as well as reducing adhesive bonding, which can potentially affect depositional accuracies and layer curling.

For example, large platens (e.g., 6-feet×8-feet) used in some additive manufacturing systems are typically required to be rigid and heavy to hold flatness to within a single layer thickness. As can be appreciated, manufacturing large platens within these flatness tolerances can be difficult and expensive. As such, the platen surfaces may exhibit small hills and valleys due to manufacturing limitations. Moreover, the platens may not necessarily be level with the intended build planes when mounted to platen gantries of the additive manufacturing systems. As such, the platen surfaces may also exhibit non-level sloping relative to the build planes.

One current technique for improving platen planarity in the build plane involves measuring the platen surface at multiple points, determining an approximate best height for the first printed layer, and then over-depositing the first layer, which deposits excess amounts of the material (i.e., thick deposited roads). This partially reduces the effects of surface non-planarity, and can increase the amount of deposited material that adheres to the platen surface. However, this technique is typically limited to smaller flatness and levelness deviations (e.g., small hills and valleys in the platen surface), which can still be difficult and expensive to achieve.

Instead, the planarizing process of the present disclosure may further improve surface planarity in the build plane, particularly when utilizing large platens. Briefly, the planarizing process involves measuring the height of the platen surface at multiple points to identify deviations from surface flatness and levelness relative to the build plane. This effectively maps the topography of the platen surface, and is preferably limited to a bounding box in which the 3D parts and support structures are to be printed (to reduce time and material requirements).

The mapped topography of the platen surface is typically limited to the area of the platen surface in which the multiple points are measured. As such, as used herein, the expression "mapped topography of the platen surface", and similar variations thereof, refer to the topography of the platen surface in which the multiple points are measured. Accordingly, the mapped topography may include an entire surface area of the platen surface if the entire platen surface is measured, or may include only one or more subregions thereof if the measurements are made only in these subregion(s).

From there, a planarizing part may be generated and printed, which compensates for the deviations from surface flatness and levelness relative to the build plane. In particular, the printed planarizing part preferably has a bottom surface that is a substantial mirror image of topography of the measured platen surface, and a top surface that is substantially planar in the build plane (i.e., substantially flat and level relative to the print head movement trajectory). This ensures that the printed material achieves good adhesive bonding to the platen surface.

The additive manufacturing system may then print one or more 3D parts and/or support structures on top of the printed planarizing part. The substantially-planar top surface of the planarizing part accordingly allows subsequent 3D parts and support structures to be printed with high resolutions, while also allowing the platen to be manufactured and installed with reasonable tolerances.

FIG. 1 illustrates system 10, which is an example additive manufacturing system for printing or otherwise building 3D parts and support structures using a layer-based, additive manufacturing technique, and utilizing the planarizing process of the present disclosure. Suitable additive manufacturing systems for system 10 include extrusion-based additive manufacturing systems developed by Stratasys, Inc., Eden Prairie, Minn. under the trademarks "FDM" and "FUSED DEPOSITION MODELING". Alternatively, system 10 may be any suitable additive manufacturing system that incorporates a platen (i.e., build substrate), and is particularly suitable for use with deposition-based additive manufacturing systems, such as extrusion-based and jetting-based systems.

In the shown example, system 10 includes chamber 12, platen 14, platen gantry 16, print head 18, head gantry 20, and consumable assemblies 22 and 24. Chamber 12 is an enclosed environment that contains platen 14 for printing 3D parts and support structures. Chamber 12 may be heated (e.g., with circulating heated air) to reduce the rate at which the part and support materials solidify after being extruded and deposited (e.g., to reduce distortions and curling). In alternative embodiments, chamber 12 may be omitted and/or replaced with different types of build environments. For example, a 3D part and support structure may be printed in a build environment that is open to ambient conditions or may be enclosed with alternative structures (e.g., flexible curtains).

Platen 14 is a platform having platen surface 14a on which 3D parts and support structures are printed in a layer-by-layer manner, and is supported by platen gantry 16. As discussed above, manufacturing a platen surface 14a with high levels of flatness can be difficult and expensive, particular in embodiments in which platen 14 has a large surface in the build plane. Moreover, when installed to platen gantry 16, platen surface 14a may not necessarily level relative to the build plane, potentially resulting in non-level sloping.

In some embodiments, platen surface 14a may also include a removable substrate such as a flexible polymeric film or liner on which the 3D parts and support structures are printed, an adhesive tape, a painted-on layer of adhesive, a cardboard liner, or a build tray such as is disclosed in U.S. patent application Ser. No. 13/791,005. As such, the term "platen surface" refers to the surface upon which the planarizing part is printed, which may be the actual surface of platen 14 and/or a film, liner, or other substrate disposed on the actual surface of the platen. Platen gantry 16 is a gantry assembly configured to move platen 14 along (or substantially along) the vertical z-axis. Correspondingly, print head 18 is supported by head gantry 20, which is a gantry assembly configured to move print head 18 in (or substantially in) the horizontal x-y plane above chamber 12.

In the shown example, print head 18 is a dual-tip extrusion head configured to receive consumable filaments from consumable assemblies 22 and 24 (e.g., via guide tubes 26 and 28) for printing 3D part 30 and support structure 32 on platen surface 14a. Examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; and Comb et al., U.S. Pat. No. 8,153,182. In additional embodiments, in which print head 18 is an interchangeable, single-nozzle print head, examples of suitable devices for each print head 18, and the connections between print head 18 and head gantry 20 include those disclosed in Swanson et al., U.S. Pat. No. 8,419,996. In jetting-based systems, print head 18 may be an inkjet head such as described in Kritchman et al., U.S. Pat. No. 8,323,017.

Consumable assembly 22 may contain a supply of a part material for printing 3D part 30, and consumable assembly 24 may contain a supply of a support material for printing support structure 32 from the given support material. As further shown in FIG. 1, print head 18 may also print planarizing part 34 from the part or support materials pursuant to the planarizing process of the present disclosure, as discussed below. Collectively, 3D part 30, support structure 32, and planarizing part 34 may be referred to as printed object 35, where support structure 32 may be optionally included when needed (e.g., to support 3D part 30).

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print 3D part 30 and support structure 32 along the x-axis or the y-axis.

System 10 also includes controller 36, which is one or more control circuits configured to monitor and operate the components of system 10. For example, one or more of the control functions performed by controller 36 can be implemented in hardware, software, firmware, and the like, or a combination thereof. Controller 36 may communicate over communication line 38 with chamber 12 (e.g., with a heating unit and/or air blower for chamber 12), platen gantry 16, print head 18, head gantry 20, and/or various sensors, calibration devices, display devices, and/or user input devices.

While illustrated as a single signal line, communication line 38 may include one or more electrical, optical, and/or wireless signal lines, allowing controller 36 to communicate with various components of system 10. Furthermore, while illustrated outside of system 10, controller 36 and communication line 38 may be internal components to system 10.

System 10 and/or controller 36 may also communicate with one or more computer-based systems, referred to as computer 40, which may include computer-based hardware, such as data storage devices, processors, memory modules and the like for generating, storing, and transmitting tool path and related printing instructions to system 10. Accordingly, computer 40 may also be external and/or internal to system 10. For example, computer 40 may be one or more external computer systems (e.g., desktop, laptop, server-based, cloud-based, tablet, mobile media device, and the like) configured to communicate with system 10 and/or controller 36 over one or more wired and/or wireless communication lines, referred to as communication line 42. Alternatively, computer 10 may be internal to system 10, and may communicate with one or more external computer devices.

In some embodiments, controller 36 itself may perform one or more of the operations typically performed by computer 40 or other components of system 10, such as generating and storing tool path and related printing instructions, perform compiler functions, and the like. In further embodiments, controller 36 and computer 40 may be integrated into a common device that performs the operations of both controller 36 and computer 40. Furthermore, in some embodiments, the steps of the planarizing process of the present disclosure may be performed in a back-and-forth manner, where controller 36 and computer 40 transmit data between each other to in an iterative manner to perform the steps of the planarizing process.

Accordingly, controller 36 and computer 40 may be collectively referred to as controller system 44. It is understood that computer-based calculations, data recording, data generation, data storage, and the like may be performed with the computer-based hardware and software of controller system 44 (i.e., controller 36 and/or computer 40), such as with one or more processors and computer storage media of controller system 44, as is well known to those skilled in the art.

During a printing operation, controller system 44 may direct platen gantry 16 to move platen 14 to a predetermined height within chamber 12. Controller system 44 may then direct head gantry 20 to move print head 18 around in the horizontal x-y plane above chamber 12. Controller system 44 may also direct print head 18 to selectively draw successive segments of the consumable filaments from container portions 22 and 24, and through guide tubes 26 and 28, respectively. This thermally melts the received successive segments such that the consumable filaments become molten materials. The molten materials are then selectively extruded from print head 18 and deposited onto platen 14 for printing planarizing part 34, and then 3D part 30 and support structure 32, in a layer-by-layer manner.

Figure 2:
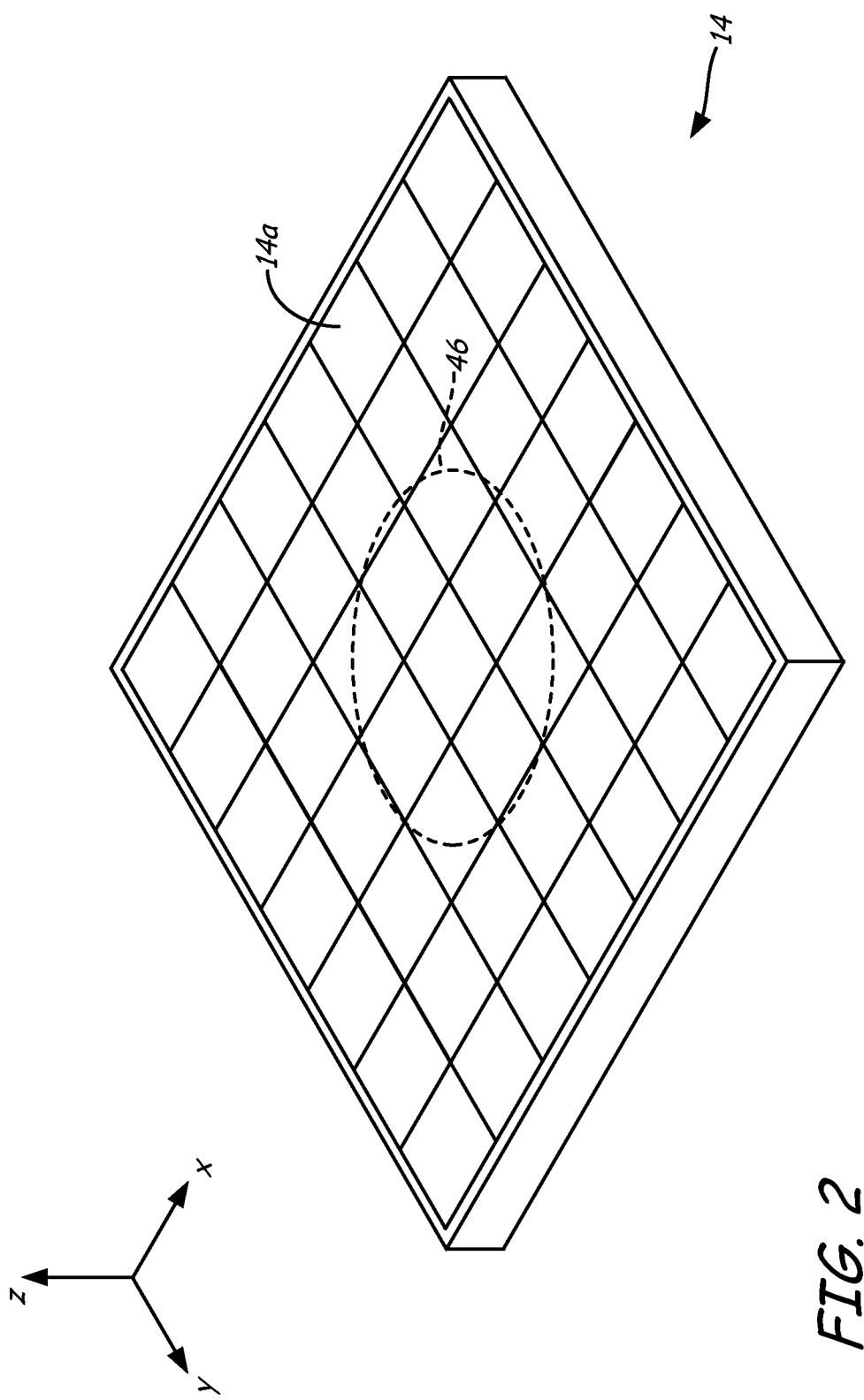
FIG. 2 is a perspective view of a platen of the additive manufacturing system, illustrating an example bounding box.

As can be appreciated, when platen surface 14a has even small deviations from planarity in the build plane, this can adversely affect printing accuracies, as well as affecting the adhesive bonding of the deposited materials to platen surface 14a. For example, as shown in FIG. 2, platen 14 may be mounted to platen gantry 16 (shown in FIG. 1) such that platen surface 14a is oriented in the x-y build plane as much as reasonably possible. However, due to manufacturing limitations, platen surface 14a may exhibit small hills and valleys that are deviations above and below an average height of platen surface 14a (i.e., non-flatness). Additionally, platen surface 14a may also deviate from levelness relative to the x-y build plane. This can create a sloping effect having a hill portion extending above the average height of platen surface 14a, and a valley portion extending below the average height of platen surface 14a.

As mentioned above, the relevant hills and valleys are preferably limited to a bounding box or footprint in which the 3D parts and support structures are to be printed, such as bounding box 46 shown in FIG. 2. This may reduce the time required to measure platen surface 14a, as well as reducing time and material requirements during the printing operation. However, in alternative embodiments, the hills and valleys may encompass the entirety of platen surface 14a, if desired or needed.

Figure 3A:
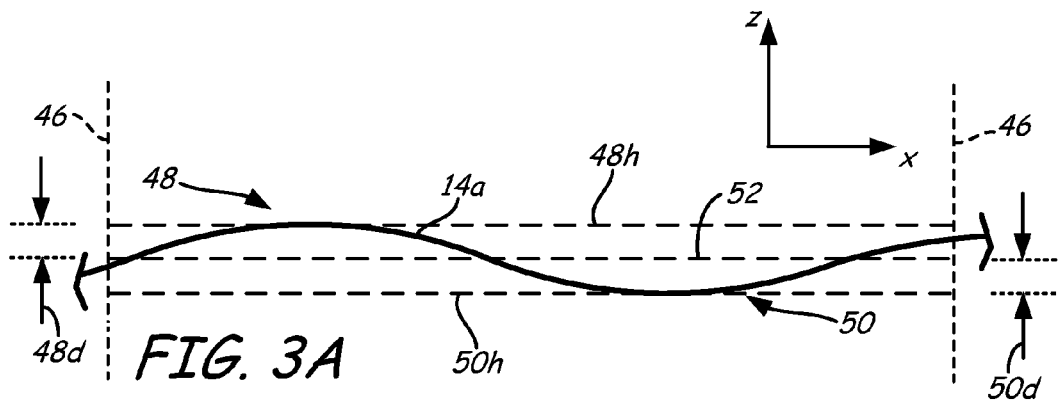
FIGS. 3A-3C are exaggerated illustrations of planarity deviations of a surface of the platen relative to a build plane.

FIG. 3A is an exaggerated illustration of example hills and valleys of platen surface 14a relative to the x-y build plane, which are referred to as hill 48 and valley 50, and which are preferably located within bounding box 46. As can been seen, hill 48 and valley 50 are respective deviations above and below an average height of platen surface 14a (referred to as average surface height 52), which is also preferably measured within bounding box 46. In the shown example, hill 48 has a height 48h, which deviates above average surface height 52 by height deviation 48d. Similarly, valley 50 has a height 50h, which deviates below the average surface height 52 by height deviation 50d.

Figure 3B:
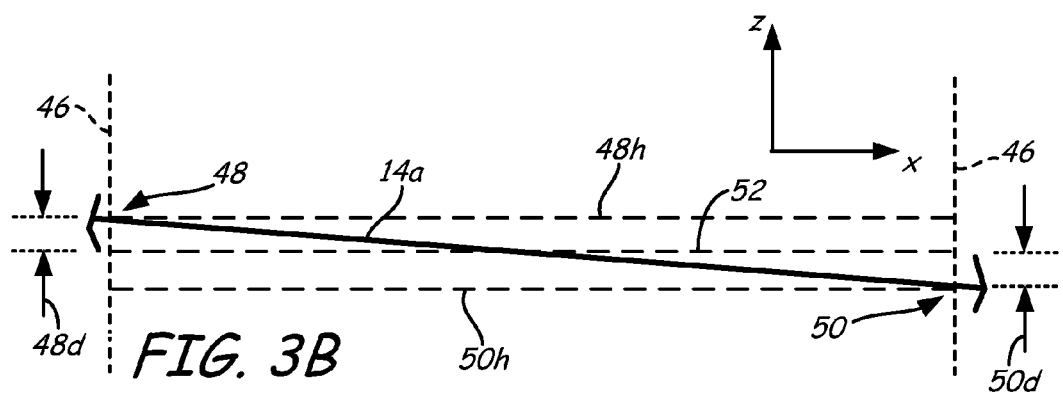

Alternatively, as shown in FIG. 3B, platen surface 14a may exhibit a non-level slope relative to the x-y build plane. This non-level slope of platen surface 14a may, for example, be due to small misalignments of platen gantry 16 and/or installation limitations when mounting platen 14 to platen gantry 16. This slope accordingly creates a hill 48 having height 48h that deviates above average surface height 52 by height deviation 48d, and a valley 50 having height 50h that deviates below average surface height 52 by height deviation 50d.

Within bounding box 46, and due to the sloped nature of platen surface 14a, hill 48 typically has a height deviation 48d above the average surface height 52 at a boundary of bounding box 46. Similarly, valley 50 typically has a height deviation 50d below the average surface height 52 at an opposing boundary of bounding box 46.

Figure 3C:
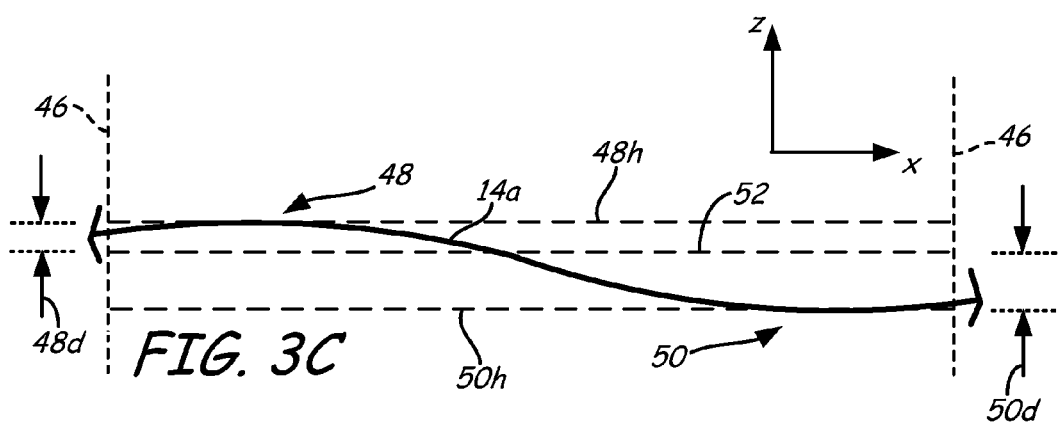

Alternatively, as shown in FIG. 3C, in many situations, platen surface 14a may include a combination of hills 48 and valleys 50 that occur due to platen surface 14a being non-flat (e.g., due to manufacturing limitations) as well due to surface sloping (e.g., due to installation limitations). As discussed below, the planarizing process of the present disclosure is configured to provide a planar surface relative to the x-y build plane regardless of the reasons for non-planarity. In other words, the planarizing process of the present disclosure may compensate for a variety of different planarity deviations relative to the x-y build plane.

In order to planarize surface platen 14a, controller system 44 may generate and print planarizing part 34 in a manner that effectively reduces hills 48 and valleys 50 as shown in FIGS. 3A-3C. For example, as shown in FIGS. 4A-4C, which correspond to the views in FIGS. 3A-3C, controller system 44 may generate planarizing part 34 having a number of layers 34t that are preferably sufficient to fill in valleys 50, and more preferably, sufficient to cover hills 48 by at least one layer thickness.

Figure 4A:
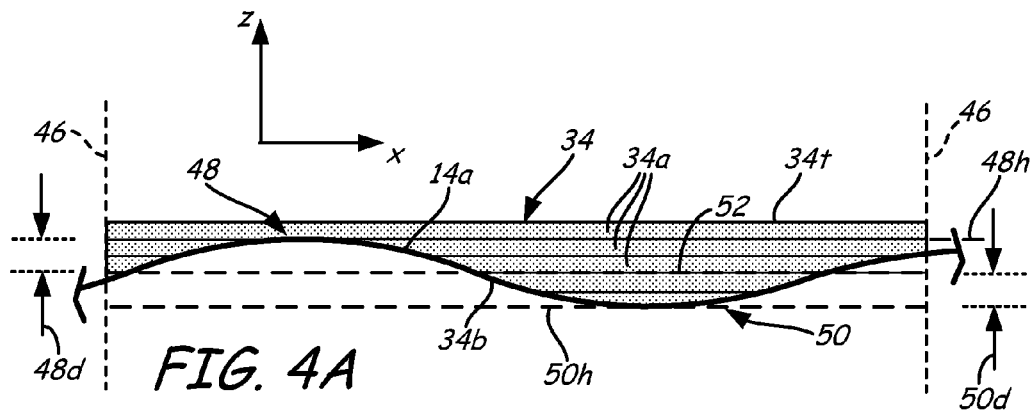
FIGS. 4A-4C are exaggerated illustrations corresponding to the views of FIGS. 3A-3C, with a printed planarizing part having substantially planar top surface, and a bottom surface that substantially mirrors the planarity deviations of the platen surface.
Figure 4B:
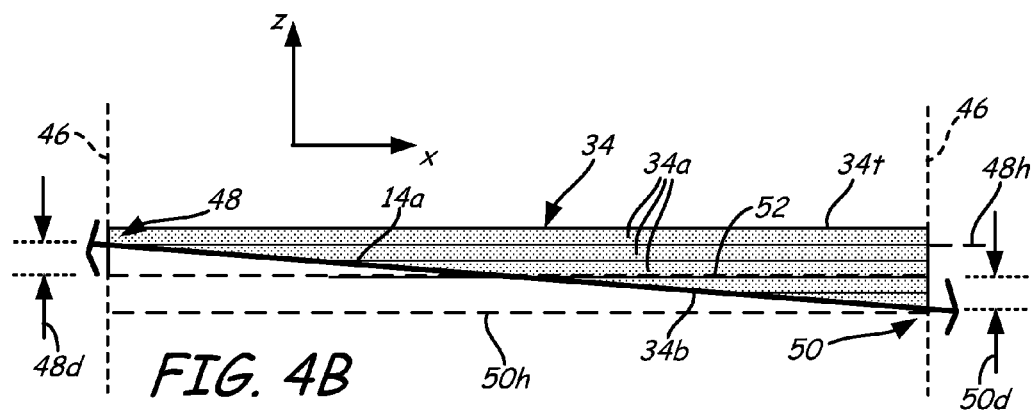
Figure 4C:
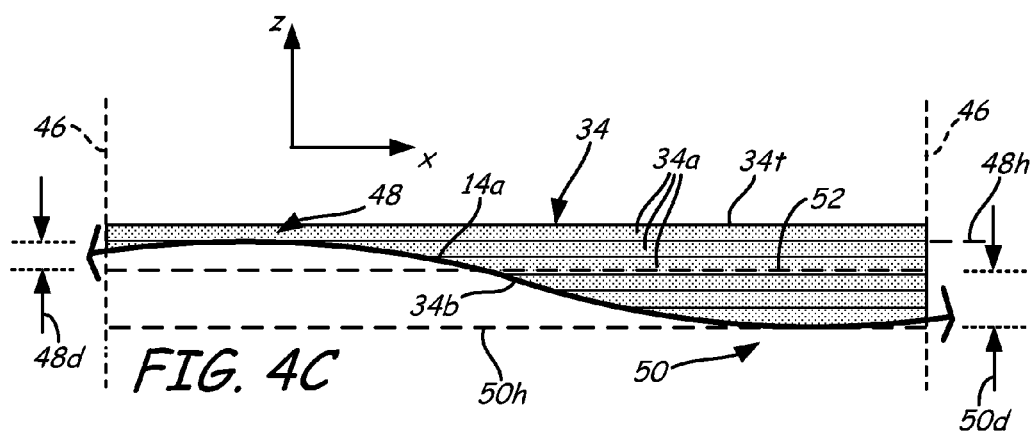

As can be seen in FIGS. 4A-4C, this provides a top surface 34t that is substantially planar relative to the x-y build plane, where top surface 34t may receive subsequently-printed layers of 3D part 30 and support structure 32. Additionally, the filling of valleys 50 and covering of hills 48 define bottom surface 34b of planarizing part 34, which substantially mirrors the topography of the planarity deviations (i.e., the topography of hills 48 and valleys 50). This allows planarizing substrate 34 to maintain a good adhesive bond to platen surface 14a, preferably at substantially all locations within bounding box 46.

Figure 5:
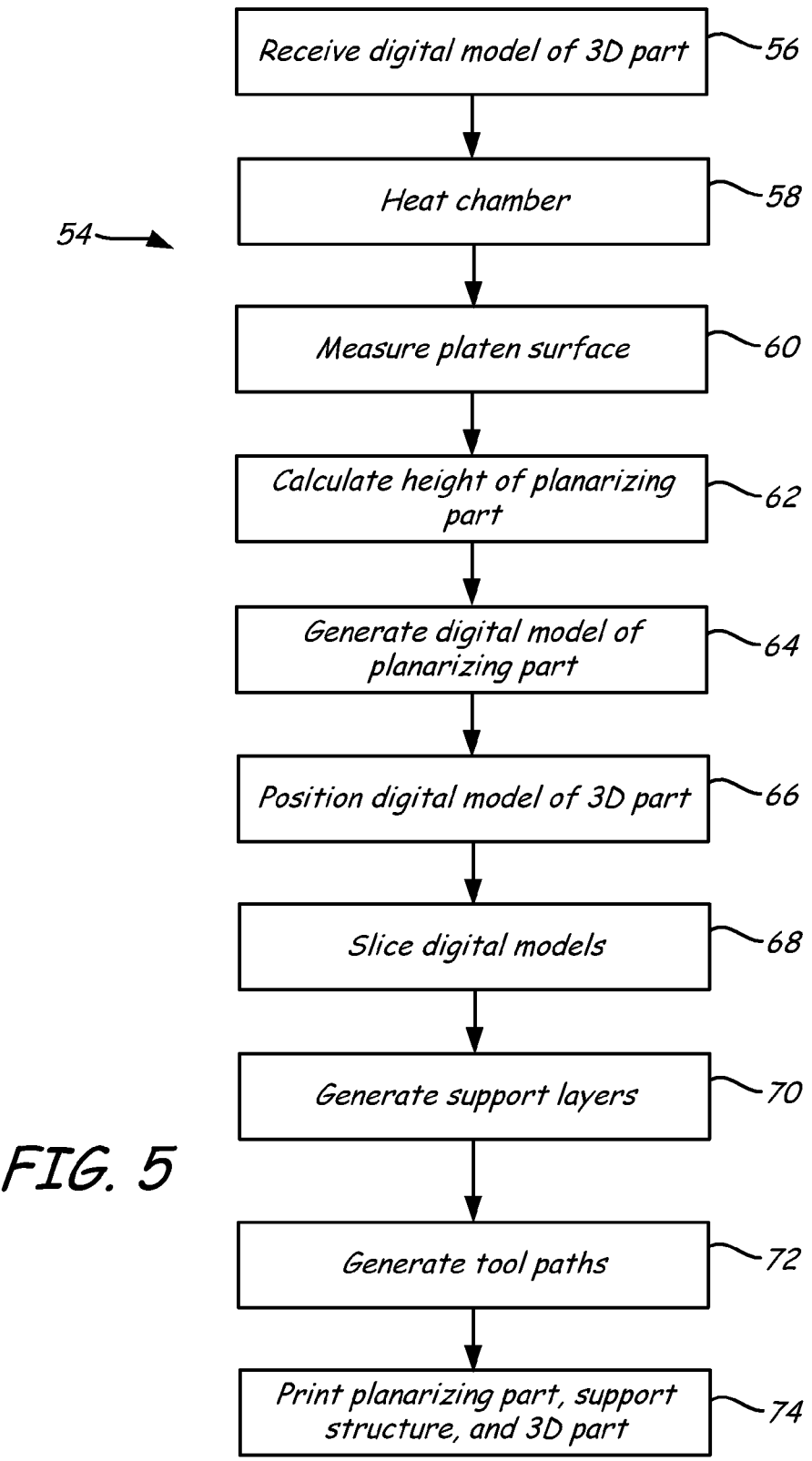
FIG. 5 is a flow diagram of a method for printing a 3D part using a planarizing process of the present disclosure.

FIG. 5 is a flow diagram of method 54, which is an example method for printing 3D parts with an additive manufacturing system using the planarizing process of the present disclosure. The following discussion of method 54 is made with reference to system 10 (shown in FIG. 1) with the understanding that method 54 may be performed with any suitable additive manufacturing system, and is particularly useful for those systems having large platens.

As shown, method 54 includes steps 56-74, and is preferably performed for each printing operation. Nonetheless, in some embodiments, one or more steps of method 54 may alternatively (or additionally) be performed during one or more calibration routines that are independent of printing operations, such as when a platen 14 and/or print head 18 are installed to system 10, during periodic intervals (e.g., daily or weekly), and the like, and may be performed in any suitable order.

When performed for a printing operation, method 54 involves receiving a digital model of 3D part 30, which is preferably stored on one or more computer storage media of controller system 44 (e.g., on computer 40) (step 56). Controller system 44 may also direct system 10 to warm up chamber 12 (or to directly warm up platen 14) to one or more operating temperatures for printing 3D part 30 and support structure 32 (step 58). This allows platen 14 to warm up to an equilibrium temperature for subsequent measurements. Alternatively, in embodiments in which chamber 12 is omitted, step 58 may also be omitted.

Controller system 44 may direct print head 18 or other suitable calibration device to measure the height of platen surface 14a along the z-axis at multiple points across platen surface 14a (step 60). In some embodiments, print head 18 may be used to measure the surface heights of the multiple points, such as discussed in Leavitt et al., U.S. patent application Ser. No. 13/422,343. Alternatively, the measurements may be performed with a separate calibration device, such as those disclosed in Calderon et al., U.S. Pat. No. 6,629,011; and Dunn et al., U.S. Pat. No. 7,680,555. In further alternative embodiments, system 10 may include one or more non-contact sensors, such as one or more optical sensors to measure the surface heights of the multiple points. The measured height values may then be recorded by controller system 44 (i.e., stored one or more computer storage media).

In some embodiments of system 10, as discussed in Skubic et al., U.S. Pat. No. 8,153,183, due to its size, head gantry 20 may bow down at its midpoint, causing print head 18 and/or other calibration device supported by head gantry 20 to follow this bowed trajectory when moving in the x-y plane. This bowed trajectory may affect the measurements made during step 60 of method 54, and can be compensated for by other techniques, such as those disclosed in Skubic et al., U.S. Pat. No. 8,153,183. As such, as used herein the term "substantially planar in the build plane", with reference to top surface 34t of planarizing part 34, includes deviations from exact flatness due to variations in the movement trajectories of print head 18 and/or calibration device.

In some embodiments, the measurements are made across the entire usable surface area of platen surface 14a, such as based an entire usable build volume for chamber 12. Alternatively, the measurements are limited to one or more subregions, such as within a bounding box of 3D part 30 and support structure 32 (e.g., bounding box 46). In either case, these measurements provide a mapped topography of platen surface 14a, which may identify any existing hills (e.g., hills 48) and valleys (e.g., valleys 50) in platen surface 14a, such as due to manufacturing and installation limitations.

The measurements of platen surface 14a are preferably made with suitable accuracies relative to the slice thickness of planarizing part 34, such as with accuracies within one-half of the smallest slice thickness $H_s$ for printing planarizing part 34. For example, for extrusion-based additive manufacturing systems, the slice thicknesses $H_s$ may correspond to the smallest expected road heights of the deposited roads of the part or support materials for printing planarizing part 34. Alternatively, for jetting-based additive manufacturing systems, the slice thicknesses $H_s$ may corresponded to the smallest expected deposited jetted droplet sizes for the part or support materials for printing planarizing part 34.

In some preferred embodiments, the slice thickness $H_s$ for printing planarizing part 34 is different (e.g., thicker) than the slice thickness used to print 3D part 30 and support structure 32. For example, it may be desired that 3D part 30 have a higher resolution, and thus finer slices, than the planarizing part 34. In additional embodiments, planarizing part 34 itself may be printed with different slice thicknesses $H_s$.

Controller system 44 may then use these measurements to define top surface 34t and bottom surface 34b of the digital model for planarizing part 34. For instance, controller system 44 may calculate a minimum height for planarizing part 34 that is required to provide a substantially-planar top surface (e.g., top surface 34t) based on the measurements from step 60 (step 62). In a preferred embodiment, controller system 44 initially identifies the highest point of the measured heights, such as height 48h of hill 48, and sets this at the peak height $Z_{peak}(x,y)$.

From there, controller system 44 may then determine the height of top surface 34t of planarizing part 34 relative to platen surface 14a, referred to as height $H_{PP}$, as a function of the peak height $Z_{peak}(x,y)$ and the slice thickness $H_s$ for planarizing part 34. In a preferred embodiment, controller system 44 may determine the height $H_{PP}$ of top surface 34t relative to relative to platen surface 14a by the following Equation 1:

$$H_{PP} = Z_{peak}(x, y) + \sum_{1}^{n} A_i * H_{s,i}$$

where "n" is the total number of different-sized slices used to create planarizing part 34, "A" is an integer designating a desired number of layers for a given slice i, and $H_{s,i}$ is the slice thickness for the given slice i, where i ranges from 1 to n. The number n may be a value of five or less, more preferably four or less, and even more preferably two or less.

For example, if planarizing part 34 is generated with a single slice thickness $H_s$ (at least for layers above the peak height $Z_{peak}(x,y)$) Equation 1 collapses down to the following Equation 2:

$$H_{PP} = Z_{peak}(x,y) + A*H_s$$

In other words, the height $H_{PP}$ of planarizing part 34 relative to platen surface 14a is the peak height $Z_{peak}(x,y)$ (e.g., height 48h of hill 48) plus "A" additional slice thicknesses. The integer "A" is preferably a low number to reduce printing time and material costs, such as from one to ten, more preferably from one to five, and most preferably one (i.e., a single layer). In this most preferred embodiment, the value n in Equation 1 will also be one. This most-preferred embodiment is illustrated above in FIGS. 4A-4C, where the top-most layer of planaring part 34 having top surface 34t is one slice or layer thickness above the peak of hill 48.

As can be appreciated, the above-discussed calculations by computer system 44 rely on the highest point of the measured heights (e.g., height 48h of hill 48) as a reference height. However, in alternative embodiments, computer system 44 may use other heights as the reference height.

For example, in some embodiments, controller system 44 may calculate average surface height 52 from the previous measurements, and use this value as the reference height. In these embodiments, controller system 44 may then calculate the local height deviations above and below this reference height (e.g., height deviations 48d and 50d) to determine the height of height $H_{PP}$ of top surface 34t relative to relative to platen surface 14a for a given point of platen surface 14a in the x-y plane. For example, controller system 44 may determine the height $H_{PP}$ of planarizing part 34 by the following Equation 3:

$$H_{PP} = Z_{ave}(x, y) + Z_{dev,ave}(x, y) + \sum_{1}^{n} A_i * H_{s,i}$$

where $Z_{ave}(x,y)$ is the average surface height (e.g., average surface height 52), and $Z_{dev,ave}(x,y)$ is the height deviation between the average surface height and the highest point of the measured heights (e.g., height deviation 48d).

In other embodiments, controller system 44 may use the lowest point of the measured heights, such as height 50h of valley 50, and use this value as the reference height. For example, controller system 44 may determine the height $H_{PP}$ of planarizing part 34 by the following Equation 4:

$$H_{PP} = Z_{floor}(x, y) + Z_{dev,floor}(x, y) + \sum_{1}^{n} A_i * H_{s,i}$$

where $Z_{floor}(x,y)$ is the lowest height (e.g., height 50h), and $Z_{dev,floor}(x,y)$ is the height deviation between the lowest point and the highest point of the measured heights (e.g., the sum of height deviations 48d and 50d). In further alternative embodiments, any other suitable reference height may be used. A comparison of Equations 1-4 show their similarities based on where the reference height is set.

Controller system 44 may then generate a digital model of planarizing part 34 (step 64). For example, the generated digital model of planarizing part 34 may include top surface 34t at height $H_{PP}$, a bottom surface 34b that substantially mirrors the topography of platen surface 14a, and a perimeter that is preferably defined by bounding box 46. Thus, the volume of the generated digital model of planarizing part 34 has cross-sectional dimensions in the x-y build plane that are preferably defined by bounding box 46, an upper limit defined by the substantially-planar top surface 34t, and a lower limit defined by the topography of bottom surface 34b.

Controller system 44 may then position (and optionally orient) the digital model of 3D part 30 at a suitable location above the digital model of planarizing part 34 (step 66). Utilizing a pre-processing program, controller system 44 may then slice the digital models of 3D part 30 and planarizing part 34 (step 68). Examples of suitable pre-processing programs includes those developed by Stratasys, Inc., Eden Prairie, Minn. under the trademarks "INSIGHT" and "CATALYST", which may be modified to slice and generate tool path instructions for each layer of planarizing part 34.

In some embodiments, the slicing operations for the digital models of 3D part 30 and planarizing part 34 may be performed in the same operation, such as with the same layer thicknesses. However, as mentioned above, in some preferred embodiments, planarizing part 34 may have different layer thicknesses than 3D part 30. As such, in these embodiments, the slicing operations may be performed successively or simultaneously, using the different slice thicknesses.

Because the topography of platen surface 14a may vary, and because top surface 34t at height $H_{PP}$ is substantially planar in the x-y plane, the thickness of planarizing part 34 along the z-axis will vary with the topography of platen surface 14a. As such, the number of sliced layers for planarizing part 34 may also vary with the topography of platen surface 14a, as illustrated above in FIGS. 4A-4C.

Accordingly, for a given point on platen surface 14a in the x-y plane, the number of layers for planarizing part 34 may be determined as a function of the height $H_{PP}$ of top surface 34t, the height for the given point, and the slice thickness $H_s$ for printing planarizing part 34. In preferred embodiments, for a given point of platen surface 14a in the x-y plane, the number of layers correspond to the number of layers extending from platen surface 14a to top surface 34 of planarizing part 34t (e.g., a single layer above the peak of hill 48).

For instance, for a point taken at the floor of valley 50, the number of layers equals the difference between the height $H_{PP}$ of top surface 34t (i.e., one slice thickness $H_s$ above height 48h) and height 50h of the floor of valley 50, divided by the slice thickness $H_s$. This corresponds to the sum of height deviations 48d and 50d, divided by the slice thickness Hs.

Controller system 44 may then use the pre-processing program to generate layers for (optional) support structure 32 (step 70), create perimeter geometries for each sliced layer, generate tool path instructions (and/or any other printing information) for 3D part 30, support structure 32, and planarizing part 34 (step 72), and transmit the information to system 10.

In an alternative embodiment, one or more of the steps for generating a digital model of planarizing part 34, slicing the digital model of planarizing part 34, and generating tool path instructions for planarizing part 34 may be post-processed into the previously-generated tool path instructions of 3D part 30 and support structure 32 with a separate post-processing program (after running the pre-processing program). This post-processing program may operated manually by a user, or may be invoked in an automated manner by the pre-processing program of controller system 44.

Accordingly, the digital model for planarizing part 34 may be generated in any desired format. For instance, in some embodiments, controller system 44 may generate the digital model of planarizing part 34 in the same or similar format as the digital model of 3D part 30 (e.g., in an STL file format). In these embodiments, controller system 44 may then slice the digital model of planarizing part 34, create perimeter geometries for each sliced layer, and generate tool path instructions, as discussed above for steps 68 and 72 of method 54.

Alternatively, controller system 44 may generate the digital model of planarizing part 34 as a pre-sliced set of layer perimeters. In these embodiments, controller system 44 may then generate tool path instructions, as discussed above for step 72 of method 54. In yet a further alternative embodiment, controller system 44 may generate the digital model of planarizing part 34 as the tool path instructions.

Figure 6:
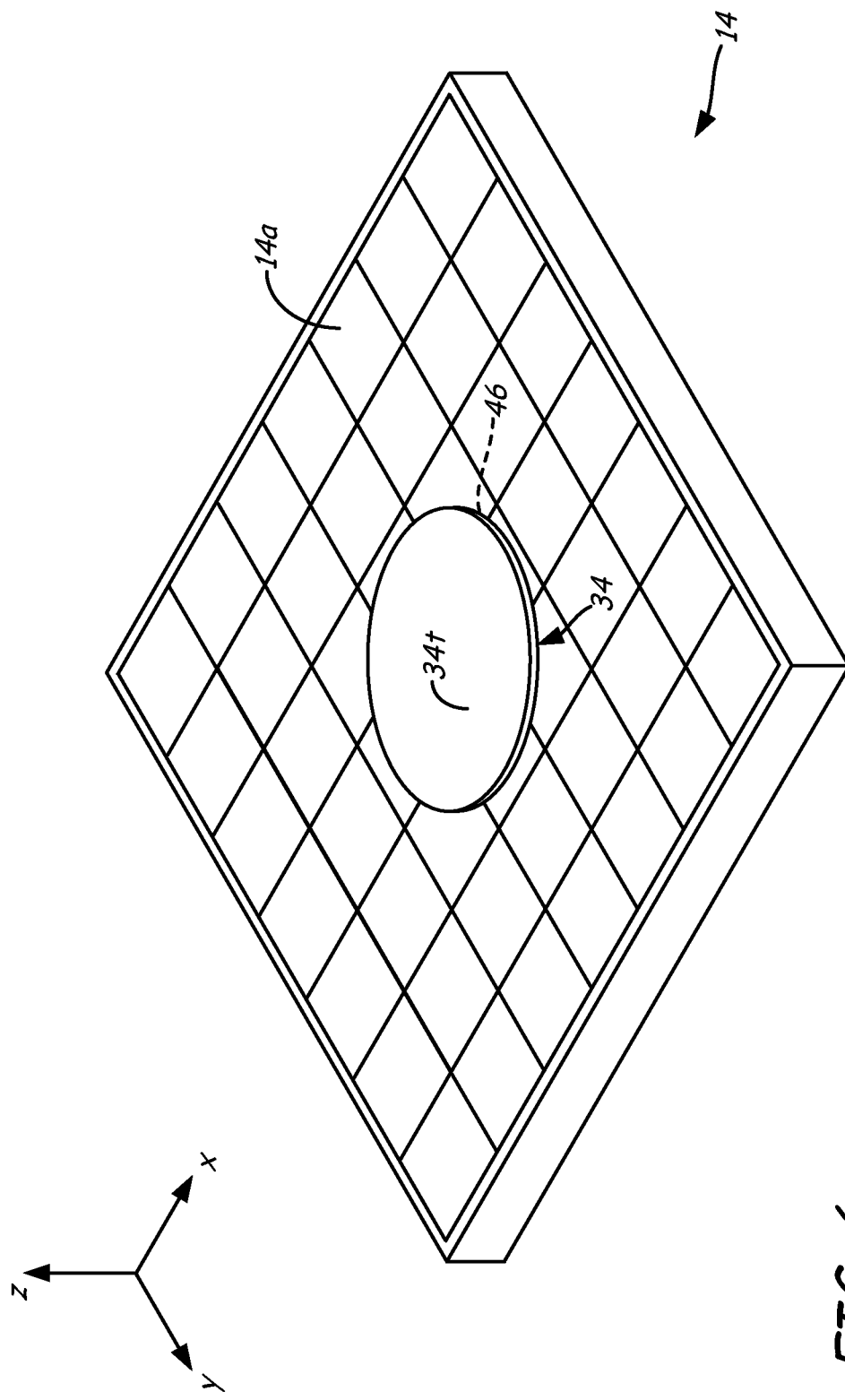
FIG. 6 is a perspective view of the platen, illustrating a planarizing part printed in the bounding box.

Upon receipt of the printing instructions, system 10 may then print planarizing part 34, support structure 32, and 3D part 30 onto platen surface 14a based on the received printing instructions (e.g., the tool paths and/or any other printing instructions) (step 74). For example, as shown in FIG. 6, system 10 may print planarizing part 34 to effectively flatten the planarity deviations of platen surface 14a within bounding box 46. This produces a substantially-planar top surface 34t to receive the subsequently printed layers of 3D part 30 and support structure 34. Furthermore, because bottom surface 34b of planarizing part 34 substantially mirrors the topography of platen surface 14a within bounding box 46, the printed material of planarizing part 34 achieves good adhesive bonding to platen surface 14a at substantially all locations within bounding box 46.

Figure 7:
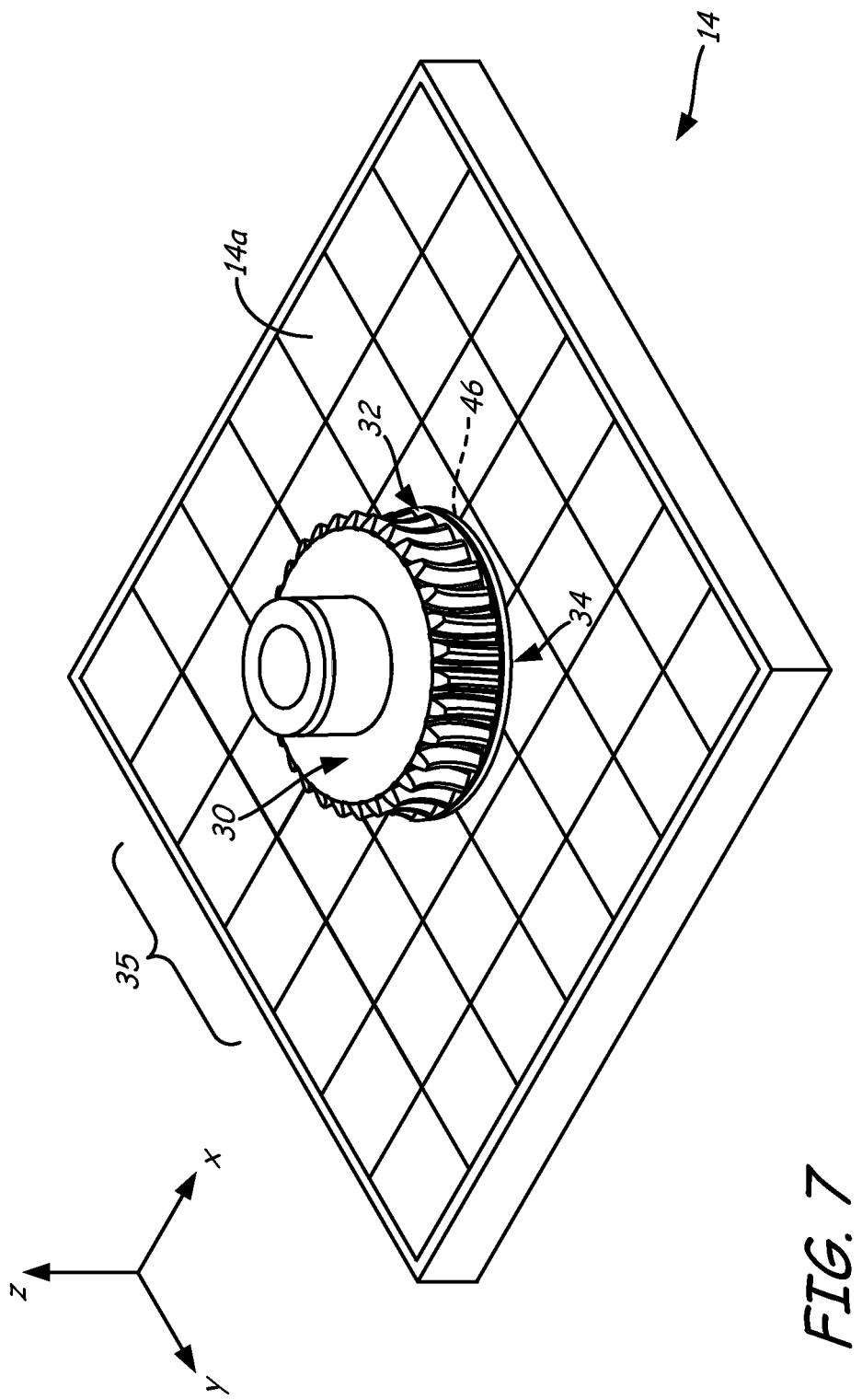
FIG. 7 is a view of the platen, illustrating the planarizing part, a support structure, and a 3D part printed in the bounding box.

As shown in FIG. 7, one or more layers of support structure 32 may be printed on top surface 34t, and 3D part 30 may then be printed on support structure 32. The substantially-planar top surface 34t of planarizing part 34 accordingly allows 3D part 30 and support structure 32 to be printed with increased resolutions, while also allowing platen 14 to be manufactured and installed with reasonable tolerances.

In the shown embodiment, 3D part 30 and planarizing part 34 may each be printed from one or more part materials (e.g., the same part material), where support structure 32 resides between them. In this embodiment, support structure 32 may be printed from a support material that is removable from 3D part 30, such as a soluble support material that may dissolve in an aqueous liquid or solution. Alternatively, support structure 32 may be printed from the part material or any other suitable material in a configuration designed to allow breaking it away from the 3D part 30.

In an alternative embodiment, planarizing part 34 may be printed from one or more support materials. In this embodiment, 3D part 30 may be printed directly onto top surface 34t of planarizing part 34, rather than requiring one or more separate layers of support structure 32 to reside therebetween. In further embodiments, planarizing part 34 may be printed at least in part by a support material and at least in part by a part material (e.g., a combination of part and support materials).

Suitable consumable materials for 3D part 30, support structure 32, and planarizing part 34 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication No. 2009/0263582; Hopkins et al., U.S. Patent Application Publication No. 2010/0096072; Batchelder et al., U.S. Patent Application Publication No. 2011/0076496; and Batchelder et al., U.S. Patent Application Publication No. 2011/0076495.

After the printing operation is completed, the resulting printed object 35 may be removed from system 10, and 3D part 30 may be removed from support structure 32 and planarizing part 34. For example, planarizing part 34 may be broken or cut away from platen 34, and the resulting printed object 35 may be placed in an aqueous liquid or solution to dissolve the soluble support material of support structure 32. The resulting 3D part 30 may then be removed from the aqueous liquid or solution for subsequent post-processing, if desired. The dissolved support structure 32 and the planarizing part 34 may also be collected from the aqueous liquid or solution and recycled or otherwise discarded in an environmentally-friendly manner.

Although the present disclosure has been described with reference to preferred embodiments, workers skilled in the art will recognize that changes may be made in form and detail without departing from the spirit and scope of the disclosure.

The invention claimed is:

1. A method for printing a three-dimensional part with an additive manufacturing system having a platen with a platen surface, the method comprising:
measuring heights of multiple points of the platen surface, wherein the measured heights provide a mapped topography of the platen surface;
calculating a height of a planarizing part as a function of the measured heights;
generating a digital model of the planarizing part based on the calculated height and the mapped topography of the platen surface;
slicing the digital model of the planarizing part into multiple layers;
printing the planarizing part with the additive manufacturing system in a layer by layer manner based on the sliced generated digital model of the planarizing part, the printed planarizing part including a printed layer forming a substantially-planar top surface in a build plane, and one or more printed layers forming a bottom surface that contacts the platen surface and substantially mirrors the mapped topography of the platen surface, wherein the bottom surface of the printed planarization part is non-parallel to the top surface of the printed planarizing part; and
printing the three-dimensional part on the substantially-planar top surface of the printed planarizing part.

2. The method of claim 1, wherein the multiple points of the platen surface are located within a bounding box of the three-dimensional part.

3. The method of claim 1, and further comprising heating at least the platen to one or more operating temperatures prior to measuring the heights.

4. The method of claim 1, wherein calculating the height of the planarizing part as a function of the measured heights comprises:
determining a peak height of the measured heights; and
calculating the height of the planarizing part as a function of the determined peak height and at least one slice thickness for the planarizing part.

5. The method of claim 4, wherein calculating the height of the planarizing part comprises an equation as follows:

$$H_{PP} = Z_{peak}(x, y) + \sum_{1}^{n} A_i * H_{s,i}$$

wherein n is a total number of different-sized slices for the planarizing part, A is an integer designating a desired number of layers for a given slice i, and $H_{s,i}$ is the slice thickness for the given slice i, and wherein i ranges from 1 to n.

6. The method of claim 5, wherein the preselected integer A is one, and wherein n is one.

7. The method of claim 1, wherein measuring the heights of the multiple points of the platen surface is performed after receiving a digital model of the three-dimensional part, and prior to printing the three-dimensional part.

8. The method of claim 1, and further comprising printing a support structure for the three-dimensional onto the substantially-planar top surface of the printed planarizing part, wherein the three-dimensional part is at least partially printed onto the support structure.

9. A method for printing a three-dimensional part with an additive manufacturing system having a platen with a platen surface, the method comprising:
measuring heights of multiple points of the platen surface, wherein the measured heights provide a mapped topography of the platen surface;
determining a peak height based on the measured heights;
calculating a height for a planarizing part as a function of the determined peak height and at least one slice thickness for the planarizing part;
generating a digital model of the planarizing part having a substantially-planar top surface at the calculated height, and a bottom surface that mirrors the mapped topography of the platen surface;
slicing the digital model of the planarizing part into multiple layers; and
printing the planarizing part in a layer by layer manner with the additive manufacturing system based on the generated and sliced digital model of the planarizing part, the printed planarizing part including a substantially-planar top surface in a build plane, and a bottom surface that contacts the platen surface and substantially mirrors the mapped topography of the platen surface, wherein the bottom surface of the printed planarization part is non-parallel to the top surface of the printed planarizing part.

10. The method of claim 9, and further comprising printing at least one of the three-dimensional part and a support structure for the three-dimensional part onto the printed planarizing part.

11. The method of claim 9, wherein the multiple points of the platen surface are located within a bounding box of at least one of the three-dimensional part and the support structure.

12. The method of claim 9, and further comprising slicing the digital model of the planarizing part into a number of layers, wherein the number of layers varies with the mapped topography of the platen surface.

13. The method of claim 9, wherein calculating the height of the planarizing part comprises an equation as follows:

$$H_{PP} = Z_{peak}(x, y) + \sum_{1}^{n} A_i * H_{s,i}$$

wherein n is a total number of different-sized slices for the planarizing part, A is an integer designating a desired number of layers for a given slice i, and $H_{s,i}$ is the slice thickness for the given slice i, and wherein i ranges from 1 to n.

14. An object printed with an additive manufacturing system having a platen with a platen surface, the object comprising:
a three-dimensional part;
optionally, a support structure for the three-dimensional part, wherein the three-dimensional part and the optional support structure have a bounding box in a build plane; and
a planarizing part comprising:
 a top surface on which one or both of the three-dimensional part and the optional support structure are printed, wherein the top surface is formed by a printed layer and is substantially planar in the build plane;
 a bottom surface that contacts the platen surface and substantially mirrors a topography of the platen surface, wherein the bottom surface is formed of one or more printed layers and is non-parallel to the top surface of the planarizing part; and
 a cross-section in the build plane defined at least in part by the bounding box.

15. The object of claim 14, wherein the planarizing part is formed of a plurality of printed layers, each printed layer having a layer thickness, and the top surface of the planarizing part has a height that is at least one layer thickness greater than a peak height of the platen surface within the bounding box.

16. The object of claim 15, wherein the at least one layer thickness is one layer thickness.

17. The object of claim 14, wherein the three-dimensional part and the planarizing part are printed with different layer thicknesses.

18. The object of claim 14, wherein the planarizing part and the three-dimensional part are printed from the same part material.

19. The object of claim 14, wherein at least a portion of the planarizing part is printed from a soluble support material.

* * * * *

UNITED STATES PATENT AND TRADEMARK OFFICE
CERTIFICATE OF CORRECTION

PATENT NO. : 9,802,360 B2  
APPLICATION NO. : 13/909294  
DATED : October 31, 2017  
INVENTOR(S) : Joseph E. LaBossiere et al.

It is certified that error appears in the above-identified patent and that said Letters Patent is hereby corrected as shown below:

On the Title Page

In the Assignee:
Delete "Stratsys, Inc." and insert --Stratasys, Inc.--

Signed and Sealed this  
Twenty-sixth Day of June, 2018

Andrei Iancu  
*Director of the United States Patent and Trademark Office*